United States Patent
Watanabe et al.

(10) Patent No.: US 6,463,358 B1
(45) Date of Patent: Oct. 8, 2002

(54) ROBOT CONTROL DEVICE HAVING OPERATION ROUTE SIMULATION FUNCTION

(75) Inventors: Atsushi Watanabe, Suginami-ku; Ryuichi Hara, Fujiyoshida; Kazunori Ban, Oshino-mura, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/117,140

(22) PCT Filed: Nov. 26, 1997

(86) PCT No.: PCT/JP97/04319

§ 371 (c)(1),
(2), (4) Date: Jan. 7, 1999

(87) PCT Pub. No.: WO98/24011

PCT Pub. Date: Jun. 4, 1998

(30) Foreign Application Priority Data

Nov. 26, 1996 (JP) .............................................. 8-329041

(51) Int. Cl.$^7$ .............................................. G06F 19/00
(52) U.S. Cl. ................ 700/253; 700/246; 700/245; 700/254; 700/88; 700/86; 318/14; 318/567; 318/568.12; 318/568.28; 901/3
(58) Field of Search ............................ 709/86–89, 245, 709/246, 256, 257, 254, 253, 184, 185, 190–193, 194, 160, 178; 318/14, 565, 567, 568.12, 568.13, 568.2, 568.22; 901/3

(56) References Cited

U.S. PATENT DOCUMENTS

| | | | | |
|---|---|---|---|---|
| 4,035,706 A | * | 7/1977 | Cutler ......................... | 318/572 |
| 4,260,940 A | * | 4/1981 | Engelberger et al. ........ | 318/562 |
| 4,433,382 A | * | 2/1984 | Cunningham et al. ...... | 700/192 |
| 4,685,067 A | * | 8/1987 | French et al. ................ | 700/181 |
| 4,706,002 A | * | 11/1987 | Fukuyama ................... | 318/568 |
| 4,706,004 A | * | 11/1987 | Komatsu et al. ............. | 318/568 |
| 4,786,848 A | * | 11/1988 | Nickerson ................... | 318/567 |
| 4,803,640 A | * | 2/1989 | Mitomi et al. .............. | 700/252 |
| 4,831,549 A | * | 5/1989 | Red et al. .................... | 700/250 |
| 5,003,237 A | * | 3/1991 | Kimura ....................... | 318/572 |
| 5,046,022 A | * | 9/1991 | Conway et al. ............. | 700/245 |
| 5,051,676 A | | 9/1991 | Seki et al. ............. | 318/568.24 |
| 5,353,386 A | * | 10/1994 | Kasagami et al. .......... | 700/247 |
| 5,467,003 A | * | 11/1995 | Kosaka et al. ......... | 318/568.13 |
| 5,504,841 A | * | 4/1996 | Tani ............................ | 700/48 |
| 5,872,894 A | * | 2/1999 | Watanabe et al. ........... | 700/252 |
| 5,880,956 A | * | 3/1999 | Graf ............................ | 700/86 |
| 5,930,460 A | * | 7/1999 | Nomaru et al. ............. | 700/245 |

FOREIGN PATENT DOCUMENTS

| | | |
|---|---|---|
| JP | 62-50906 | 3/1987 |
| JP | 64-26909 | 1/1989 |
| JP | 1-145703 | 6/1989 |
| JP | 1-312605 | 12/1989 |
| JP | 2-100704 | 4/1990 |
| JP | 3-250304 | 11/1991 |
| JP | 6-126667 | 5/1994 |
| JP | 7-36516 | 2/1995 |

\* cited by examiner

Primary Examiner—Ramesh Patel
(74) Attorney, Agent, or Firm—Staas & Halsey LLP (57) ABSTRACT

A robot controller capable of finding a mistaught path and avoiding dangers involved in a real motion of a robot without using an off-line simulation system. An operation program for confirming safety is played back with the robot control system arranged such that a simulation function is on, a real motion is off, and comparison processing is on. When a played-back path designated by each block is compared with a reference path using data on interpolation points, an interpolation point ordinal index i is incremented by "1" (K1), an interpolation point on a reference path Tref(i) is read (K2) and compared with a corresponding interpolation point on the played-back path T(i). An index of distance $d(i)$ and a distance evaluation index $\Delta d(i)$ are calculated (K3, K4), and tool-tip orientation difference indices $f(i)$ to $h(i)$ and orientation-evaluation indices $\Delta f(i)$ to $\Delta h(i)$ are calculated (K5, K6). Based thereon, it is determined whether or not there is a path difference exceeding a reference value. The processing may be started with a real motion in an on-state, and the real motion of the robot may be nullified when a large path difference is found.

20 Claims, 6 Drawing Sheets

ROBOT CONTROL DEVICE HAVING OPERATION ROUTE SIMULATION FUNCTION

TECHNICAL FIELD

The present invention relates to a motion path simulating technique for preventing an obstruction due to mis-teaching to a robot, which is likely to occur in constructing an automated system using an industrial robot, and securing a safe working environment.

BACKGROUND ART

In teaching a required motion to a robot, it is very important to confirm that the teaching has been correctly completed, especially that the teaching does not involve an unintended path movement in view of ensuring normal robot operation and also preventing physical injury and interference with a peripheral device. As a method for confirming the teaching in view of the above, the following two methods are conventionally known.

(I) A playback operation of the taught program is performed on the condition that the robot moves at a very low speed, for example, by designating a low override value, and safety of a motion is visually confirmed.

(II) Using a system for performing teaching and confirmation of a motion in an off-line state, safety of the motion is sufficiently confirmed by the off-line system and then an operation program is downloaded to a robot controller to be used in a real operation.

However, both of the techniques have problems. In the technique (I), extremely low-speed motion and close attention of an operator are required in order to surely avoid an unexpected accident. Therefore, work efficiency is very low, and an operator bears a large burden. Generally, it is usual that several times of corrections are needed until teaching of a desired motion is completed. Therefore, if confirmation of the motion by the low-speed operation is performed each time, large time is consumed in entire teaching operation. Further, there are many cases where an operation program is modified, after teaching is once completed, due to a change of type or arrangement of a robot hand or a peripheral device to be used. In such cases, large time is additionally consumed in confirmation of a motion resulting from the modified program.

The technique (II), which performs confirmation of a motion in the off-line system, does not need a real motion of a robot. Therefore, safety of confirmation operation itself is ensured. However, in order to raise reliability of the confirmation of a motion, precise reproduction of a robot motion in the off-line system is required, and data input work and the like for such precise reproduction is very burdensome. Further, if type or arrangement of a robot hand or a peripheral device is changed after an operation program which has undergone the confirmation in the off-line state is downloaded to a real machine, the operation program is modified accordingly. Thus, the confirmation by the low-speed operation as described in the above (I) is required after all.

DISCLOSURE OF INVENTION

An object of the present invention is to make it possible to simulate a motion path after it is modified and to obtain information useful in finding an error in teaching of a motion path without using an off-line simulation system and without repeating low-speed playback operation of a real machine each time teaching of a motion path is modified. Another object of the present invention is to make it possible, even when a playback operation of a real machine is started or about to be started after teaching of a motion path is modified, to stop the motion of a robot to prevent an accident if it is found that the modified teaching has an error. By doing so, safety and efficiency of teaching operation is improved.

According to the present invention, a robot controller has a function of simulating a motion path, in addition to ordinary functions by operation program storing means, operation program regenerating means, and real motion means for making a robot perform a real motion when an operation program is played back.

The motion path simulating function of the robot controller of the present invention is based on path memory means for storing a motion path described in an operation program when the operation program stored in the operation program storing means is played back, and path comparison means for comparing a motion path described in the operation program with a motion path described in a preceding operation program. The path memory means, the path comparison means and the real motion means can be designated selectively to be operative or non-operative, according to a mode of performance. An operation program may be played back in a manner such that the robot does not perform a real motion or in a manner such that the robot performs a real motion. Further, combined designation such that the robot performs or does not perform a real motion selectively may be provided.

The path comparison means used in the present invention uses a first motion path memorized in the path memory means as a reference motion path and compares a motion path described in the second operation program with the reference motion path when the second operation program other than an operation program describing the reference motion path is played back. Then a difference between both motion paths is evaluated with regard to position or both position and orientation of the robot (typically, a tip of a tool), and result of evaluation is outputted.

When the path memory means stores a motion path including data indicative of an interpolation point, and the path comparison means compares a played back motion path and a reference motion path using data indicative of interpolation points on both motion paths, a difference between the played back motion path and the reference motion path can be evaluated with high precision.

In a preferred embodiment, there are additionally provided a function of automatically displaying result of the evaluation outputted from the path comparison means, for example, on a display provided on a teaching operation panel, and a function of outputting a predetermined message (for example, outputting on a display a warning of exceeding a reference value, or outputting a sound alarm activating signal) when result of the evaluation indicates that there is a difference exceeding the reference value between a played back motion path and a reference motion path.

The present invention may be arranged such that when the robot is made to perform a real motion by playing back an operation program, if the path comparison means outputs result of the evaluation indicating that there is a difference exceeding the reference value between a played back motion path and a reference motion path, the real motion state of the robot is nullified to prohibit the succeeding motion of the robot. In this arrangement, the robot can be made to perform a real motion checking a difference between a played back motion path and a reference motion path, and when the real motion path deviates largely from the reference path, the real motion of the robot can be stopped to prevent dangers. This is also helpful in finding where mis-teaching occurs.

BEST MODE OF CARRYING OUT THE INVENTION

Figure 1:
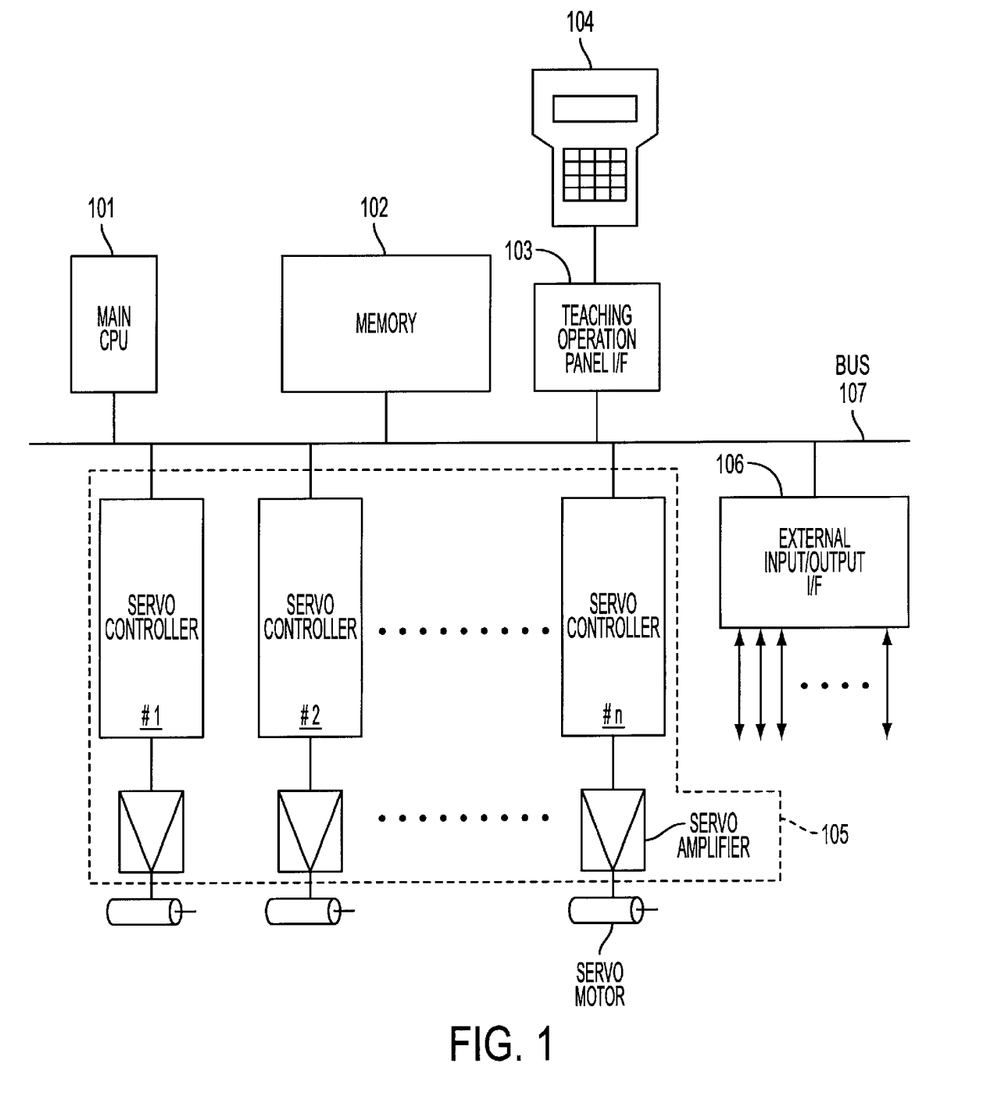
FIG. 1 is a schematic block diagram showing a hardware structure of a robot controller.

A robot controller of the present invention can be embodied by a robot controller having an ordinary hardware structure which is provided with software for performing processing as described later. FIG. 1 shows a principal part of an ordinary hardware structure of such robot controller as a schematic block diagram. A main CPU 101, a memory 102 including a RAM, a ROM and a non-volatile memory (EEPROM etc.), a teaching operation panel interface 103, an input/output interface 106 for external devices, and a servo control section 105 are connected in parallel to a bus 107.

A teaching operation panel 104 connected to the teaching operation panel interface 103 is an ordinary one having a display function. Through manual operation of the teaching operation panel 104, an operator performs preparation, modification and record of an operation program of a robot, designation of various parameters, a playback operation of a taught operation program, jog-feeding and so forth. The display is used also for displaying result of a simulation (described later).

System programs supporting basic functions of a robot and the robot control system are stored in the ROM of the memory 102. An operation program of the robot taught according to an application and the related designated data are stored in the non-volatile memory 102 of the memory 102. The RAM of the memory 102 is used as a storage region for temporary storage of data in various arithmetic operations performed by the CPU 101.

The servo control section 105 including servo controllers #1 to #n (n: the number of axes of the robot) receives a motion command prepared by arithmetic operations for the robot control (preparation of a path plan, interpolation and inverse transformation based on the path plan, etc.) and controls, through respective servo amplifiers, servo motors which constitute actuators of robot mechanisms of respective axes. It is to be noted that when a "motion path storing—real machine inoperative mode" is performed according to the method of the present invention, a motion command is not delivered to the servo control section 105 so that the servo motors for the respective robot axes do not operate, as described below.

Next, processing to be executed in the robot controller will be explained with respect to three embodiments (first to third embodiments).

In the processing to be executed according to the first or second embodiment, the following mode flags F1 to F3 are prepared in the memory 102 as means for designating operation or non-operation of a path memory means, a path comparison means, and a robot real machine, respectively. Each of the flags F1 to F3 is a binary register served as a mode selection switch, and takes a value of "0" or "1". An operator can select a desired operation mode by designating the value of each flag to be "0" or "1" in advance through the teaching operation panel 104.

F1: a flag functioning as a switch for selecting ON (F1=1)/OFF (F1=0) of a simulation function which characterizing the present invention.

F2: a flag functioning as a switch for selecting ON (F2=1)/OFF (F2=0) of a real motion (motion of the real robot).

F3: a flag functioning as a switch for selecting On (F3=1)/OFF (F3=0) of a comparison mode (mode for comparing a present path and a reference path)

Figure 2:
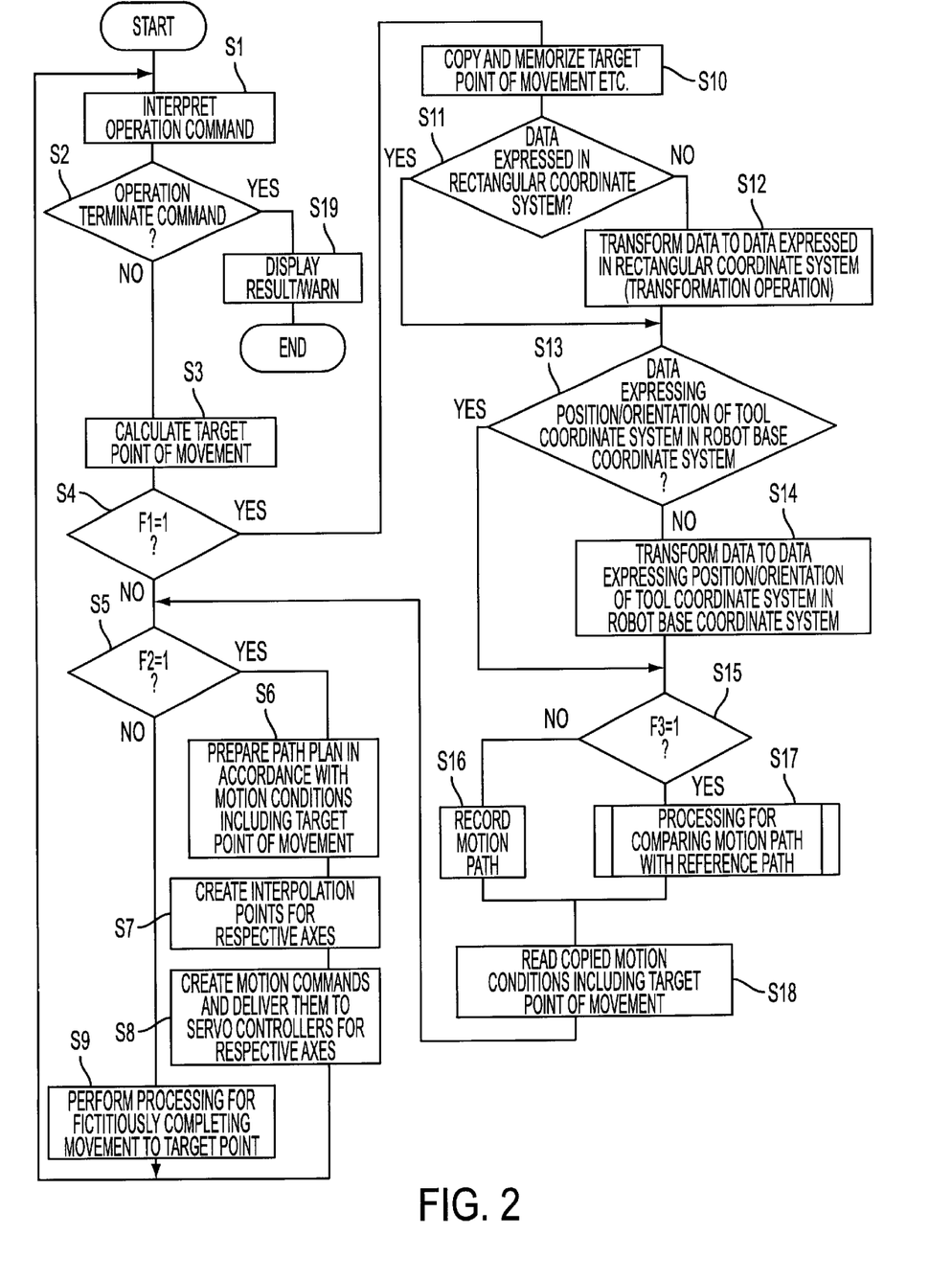
FIG. 2 is a flowchart schematically showing processing in a first embodiment of the present invention.

FIG. 2 is a flowchart for explaining essentials of processing to be executed in the first embodiment of the invention. The processing starts which an operator inputs a processing start command through the teaching operation panel 104 after the values of the above flags F1 to F3 are set (mode selections are completed). The CPU 101 reads one block of motion commands (in this embodiment, including an operation terminate command) of an operation program prepared by preceding teaching operation, and interprets (decodes) the command (Step S1).

Generally, operation commands (except for an operation terminate command) includes an absolute-position motion command, a relative-position motion command, a velocity command, a positioning manner at a target position (positioning rate), an external input/output command, and so forth. Unless the read block is an operation terminate command (when the determination in Step S2 is "No"), the procedure proceeds to Step S3, where a target point of movement (position and orientation) is calculated from a given motion command. Data of a target point of movement is calculated as data expressed in a designated coordinate system. For example, if a work coordinate system is designated, data expressing a target point of movement in the work coordinate system is obtained. If a motion command is designated for respective axes, data expressing a target point of movement by respective axes values is obtained. Next, in Step S4, the value of the flag F1 is checked to determine whether or not a mode for performing a simulation is designated.

If F1=0 (simulation is not to be performed), the procedure proceeds to Step S5, where whether or not a real motion is required is determined based on the value of the flag F2. If F2=0, which means that a mode not requiring a real motion is designated, the procedure proceeds to Step S9, where processing for fictitiously completing a movement to a target point of movement designated by the block (internal processing necessary for proceeding to processing of the next block) is performed. Then, the procedure returns to Step S1 and processing of the next one block of operation commands is started.

In Step S5, if F2=1, which means a mode for a real motion, processing for an ordinary playback operation is performed in Steps S6–S8. Specifically, a path plan is prepared in accordance with the motion condition read and interpreted in Step S1 (target position of movement, designated velocity form of movement [straight-line movement/circular-arc movement/respective axes movement, etc.], acceleration/deceleration conditions, etc.) (Step S6), interpolation points for respective axes are obtained (Step S7), and motion commands based thereon are prepared and delivered to the servo control section 105 for the respective axes (Step S8).

It is to be noted that Steps S7 and S8 are repeated to each interpolation period through it is not shown in the flowchart of FIG. 2, and that when processing for movement designated by one block is completed, the procedure returns to Step S1 to start processing of the next one block of operation commands.

If the flag F1 is designated to be "1" (F1=1) for performing a simulation, the procedure proceeds from Step S4 to Step S10. In Step S10, the target point of movement and the other motion condition data (designated velocity, form of movement, acceleration/deceleration conditions, etc.) calculated in Step S3 are copied and temporarily memorized in a space area of the memory 102.

Then, whether or not the target point of movement calculated in Step S3 is provided as data expressed in a rectangular coordinate system is determined (Step S11). If the determination is "Yes", the procedure proceeds directly to Step S13, and if the determination is "No", the procedure proceeds to Step S13 after the data is transformed to data expressed in the rectangular coordinate system by transformation operation (Step S12).

In Step S13, it is determined whether or not the data on target point of movement expresses position and orientation of a tool coordinate system in a specified robot coordinate system which is used as a reference coordinate system in path comparison (for example, a robot base coordinate system is designated in advance). If the determination is "Yes", the procedure proceeds directly to Step S15, and if the determination is "No", the procedure proceeds to Step S15 after the data is transformed to data expressed in the robot coordinate system by transformation operation between coordinate systems (Step S14).

In Step S15, it is determined whether or not a mode for performing a simulation in a comparison mode is designated. If F3=0 (non-comparison mode), the procedure proceeds to Step S16, where a motion path consisting of the target point of movement and the form of movement (a straight-line movement, a circular-arc movement or a respective axes movement) is memorized in the memory 102 with a simulation performance identification number. For example, if the present simulation is a third-time performance of simulation of an operation program named "AA", a number "SIM03AA" is given.

If F3=1 (comparison mode), the procedure proceeds to Step S17 and comparison processing is performed. Comparison processing is processing such that the present movement path a reference path are compared and the result of comparison is recorded if necessary. An example of algorithm used in the comparison processing will be described later.

When the comparison processing is completed, the procedure proceeds to Step S18, where the data temporarily memorized in Step S10 (the target point of movement and the other motion condition data) is read out. Then the procedure proceeds to Step S5.

As already described, in Step S5 and the following Steps, processing for movement of the robot real machine (Steps S6 to S8) or processing for fictitiously completing a movement to the target point (Step S9) is performed according to the value of the flag F2 ("0" or "1"), and the procedure returns to Step S1. Needless to say, the movement of the robot real machine is performed based on the data read out in Step S18. The above described processing cycle is repeated until it is determined "Yes" in Step S2. When it is determined "Yes" in Step S2, the result of comparison processing 17 (details thereof will be described later) is displayed on the display provided on the teaching operation panel 104, and the processing is terminated (Step S19). It is preferable that is the result of the comparison processing 17 indicates a difference of the movement paths exceeds a reference value, processing for outputting a predetermined message is performed, for example, an alarm signal is outputted for activating a buzzer or the like.

Next, the comparison processing performed in Step S17 will be described. The comparison processing is processing such that a movement path being simulated is compared with a reference path to determine whether or not there is a "deviation" exceeding a predetermined value between the two paths, and to record the result of the comparison if necessary. For the comparison, a single index or two or more indices for expressing a "deviation" between the two paths are used. As an algorithm for calculating indices of the distance and evaluating the result of comparison, various ones can be adopted. In the first embodiment, an algorithm shown in a flowchart of FIG. 3 is adopted.

As a reference path, a path recorded in the latest performance of Step S16 is used generally. Alternatively, a different specific path (for example, a path of which safety has been confirmed by the low-speed operation) may be designated as a reference path using the above mentioned simulation performance identification number.

Figure 3:
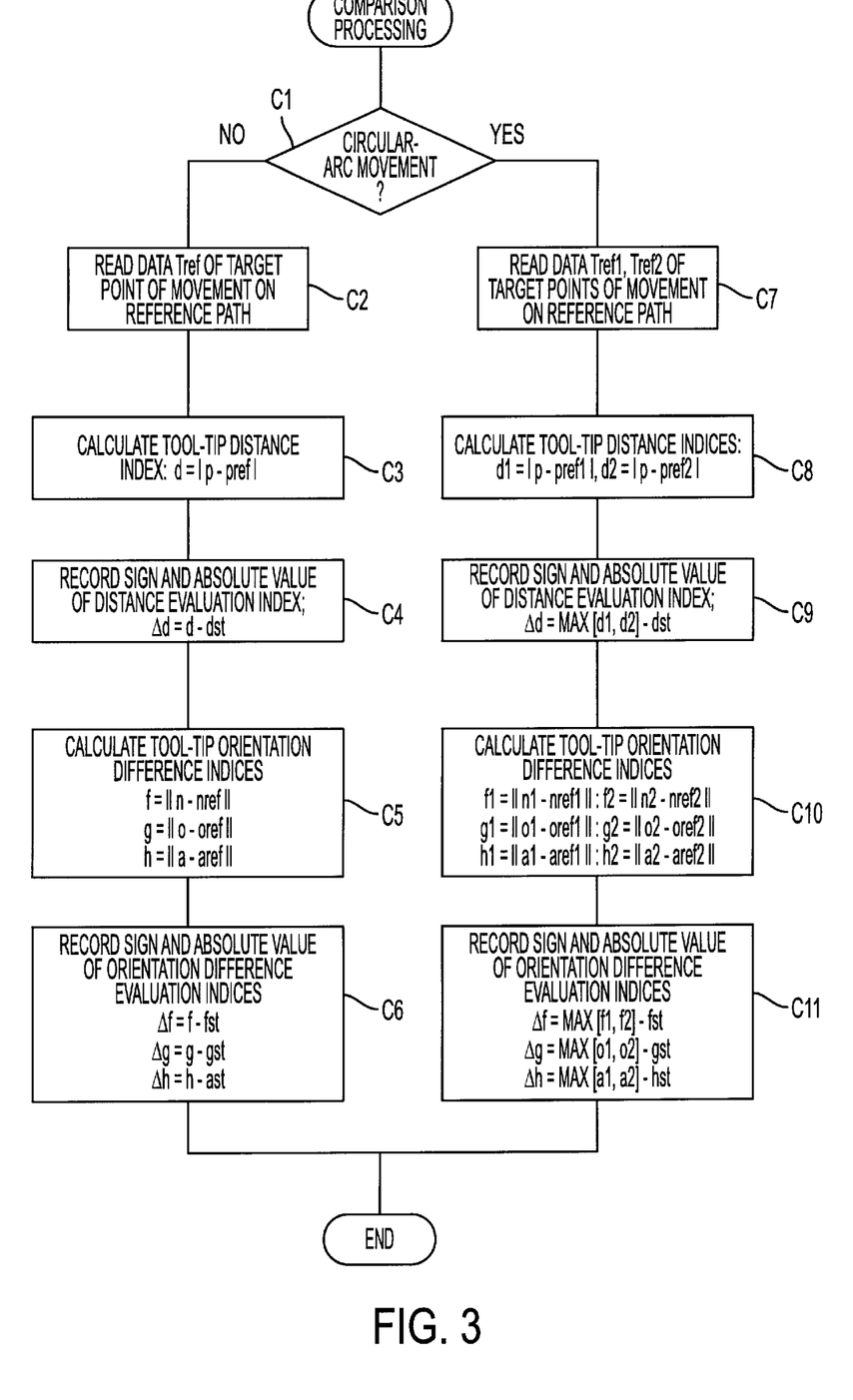
FIG. 3 is a flowchart schematically showing comparison processing performed in the first embodiment or a third embodiment of the present invention.

In the processing shown by the flowchart of FIG. 3, the difference between the paths is evaluated with regard to position and orientation. Specifically, the difference between the paths is evaluated using an index dp for evaluation in terms position of the tool tip and an index dc for evaluation in terms of orientation of the tool tip. The essentials of each step are as follows:

First, for the path comparison, data of one or two target points of movement on a reference path memorized in the memory 102 is read out depending on whether the form of movement is a circular-arc movement or not (Step C1). If the form of movement is not a circular-arc movement but a straight-line movement or a respective-axis movement, only a terminal point of a straight-line movement designated by the block is a target point of movement, and the memorized data is such that position and orientation of the tool tip at the terminal point of the straight-line movement is expressed in a reference robot coordinate system. A homogeneous transformation matrix expressing that data is denoted by Tref (Step C2).

If the form of movement is a circular-arc movement, target points of the movement are an intermediate point and a terminal point of the circular-arc movement designated by the block. Therefore, homogeneous transformation matrices expressing position and orientation of the tool tip at those two points are read out. Those matrices are denoted by Tref1 and Tref2, respectively (Step C7). Similarly, data obtained in Step S14 with respect to the path being simulated is denoted by T (in the case of a straight-line movement or a respective-axis movement) or T1, T2 (in the case of a circular-arc movement).

As well known in this field of art, each matrix consists of a partial matrix R (3 rows×3 columns) expressing rotation and a vector p (1 row×3 columns) expressing shifting, and each partial matrix R can be expressed using a normal vector N (1 row×3 columns), an orientation vector o (1 row×3 columns), and an approach vector a (1 row×3 columns) as in the following expressions (1) to (6). Such expressions will be used in the following description.

$$T = \left[\begin{array}{c|c} R & p \\ \hline 0 & 1 \end{array}\right] = \left[\begin{array}{ccc|c} n & o & a & p \\ \hline & 0 & & 1 \end{array}\right] \quad (1)$$

$$T1 = \left[\begin{array}{c|c} R1 & p1 \\ \hline 0 & 1 \end{array}\right] = \left[\begin{array}{ccc|c} n1 & o1 & a1 & p1 \\ \hline & 0 & & 1 \end{array}\right] \quad (2)$$

$$T2 = \left[\begin{array}{c|c} R2 & p2 \\ \hline 0 & 1 \end{array}\right] = \left[\begin{array}{ccc|c} n2 & o2 & a2 & p2 \\ \hline & 0 & & 1 \end{array}\right] \quad (3)$$

$$Tref = \left[\begin{array}{c|c} Rref & pref \\ \hline 0 & 1 \end{array}\right] = \left[\begin{array}{ccc|c} nref & oref & aref & pref \\ \hline & 0 & & 1 \end{array}\right] \quad (4)$$

$$Tref1 = \left[\begin{array}{c|c} Rref1 & pref1 \\ \hline 0 & 1 \end{array}\right] = \left[\begin{array}{ccc|c} nref1 & oref1 & aref1 & pref1 \\ \hline & 0 & & 1 \end{array}\right] \quad (5)$$

$$Tref2 = \left[\begin{array}{c|c} Rref2 & pref2 \\ \hline 0 & 1 \end{array}\right] = \left[\begin{array}{ccc|c} nref2 & oref2 & aref2 & pref2 \\ \hline & 0 & & 1 \end{array}\right] \quad (6)$$

In Step C3 or C8, an index d, d1, d2 expressing a distance between positions of the tool top at the respective target points on both paths is calculated according to the following expressions (7)–(9):

In the case of a straight-line movement or a respective-axis movement (Step C3);

$$d=|p-pref| \quad (7)$$

In the case of a circular-arc movement (Step C8);

$$d1=|p1-pref1| \quad (8)$$

$$d2=|p2-pref2| \quad (9)$$

Then, in Step C4 or C9, the tool top distance index d, d1, d2 is compared with a reference value dst to obtain an distance evaluation index Δd according to the following expression (10) or (11), and the sign and the absolute value of the distance evaluation index are recorded. If the sign is positive, it means that the tool tip distance exceeds the reference value. If the sign is negative or 0, it means that the tool tip distance does not exceed the reference value.

In the case of a straight-line movement or a respective-axis movement (Step C4);

$$\Delta d = d - dst \quad (10)$$

In the case of a circular-arc movement (Step C9);

$$\Delta d = MAX[d1, d2] - dst \quad (11)$$

Next, evaluation of difference in orientation is performed. First, in Step C5 or C10, indices f, g, h, f1 . . . g2, h2 expressing a difference of orientations of the tool tip of respective target points of movement on both paths are calculated according to the following expressions (12)–(20). Specifically, the orientations of the tool tip each analysed into a normal vector, an orientation vector and an approach vector are compared to evaluate the difference in orientation. Sign ∥ ∥ in the following expressions means a norm of vector.

In the case of a straight-line movement or a respective-axis movement (Step C5);

$$f=\|n-nref\| \quad (12)$$

$$g=\|o-oref\| \quad (13)$$

$$h=\|a-aref\| \quad (14)$$

In the case of a circular-arc movement (Step C10);

$$f1=\|n1-nref1\| \quad (15)$$

$$f2=\|n2-nref2\| \quad (16)$$

$$g1=\|o1-oref1\| \quad (17)$$

$$g2=\|o2-oref2\| \quad (18)$$

$$h1=\|a1-aref1\| \quad (19)$$

$$h2=\|a2-aref2\| \quad (20)$$

Then, in Step C6 or C11, the indices of difference of orientations of the tool tip are compared with respective reference values fst, gst, hst to obtain orientation-difference evaluation indices Δf, Δg, Δh according to the following expressions (21)–(23) or (24)–(26), and the sign and the absolute value of the orientation-difference evaluation indices are recorded.

$$\Delta f = f - fst \quad (21)$$

$$\Delta g = g - gst \quad (22)$$

$$\Delta h = h - hst \quad (23)$$

$$\Delta f = MAX[f1, f2] - fst \quad (24)$$

$$\Delta g = MAX[g1, g2] - gst \quad (25)$$

$$\Delta h = MAX[h1, h2] - hst \quad (26)$$

As in the case of the distance evaluation index Δd, if the sign of the orientation-difference evaluation index Δf, Δg or Δh is positive, it means that the difference in the relevant orientation component exceeds a reference value. If the sign is negative or 0, it means that the difference does not exceed the reference value.

The above is the gist of the comparison processing performed in Step S17. Data recorded in Steps C4, C9 or Steps C6, C11 is displayed in Step S19 as mentioned above. Further, it is preferable that if at least one of the distance evaluation index Δd and the orientation-difference evaluation indices Δf, Δg, Δh has a positive sign, a alarm signal is outputted to output a predetermined message, for example, in the form of sound, blinking display, etc. to thereby call an operator's attention.

The gist of processing in the first embodiment is as described above. In the first embodiment, record of a motion path and path comparison based thereon are performed only with respect to a target point of movement which is designated by each block of motion commands of an operation program. Therefore, in a path section for which a circular-arc movement or a respective-axis movement is designated as the form of movement, record of a motion path and path comparison based thereon may be performed with low precision. Thus, in the second embodiment described below, record of a motion path and path comparison are performed considering position and orientation at points (interpolation points) between target points of movement on a path to thereby improve precision in a path section for which a circular-arc movement or a respective-axis movement is designated.

Figure 4:
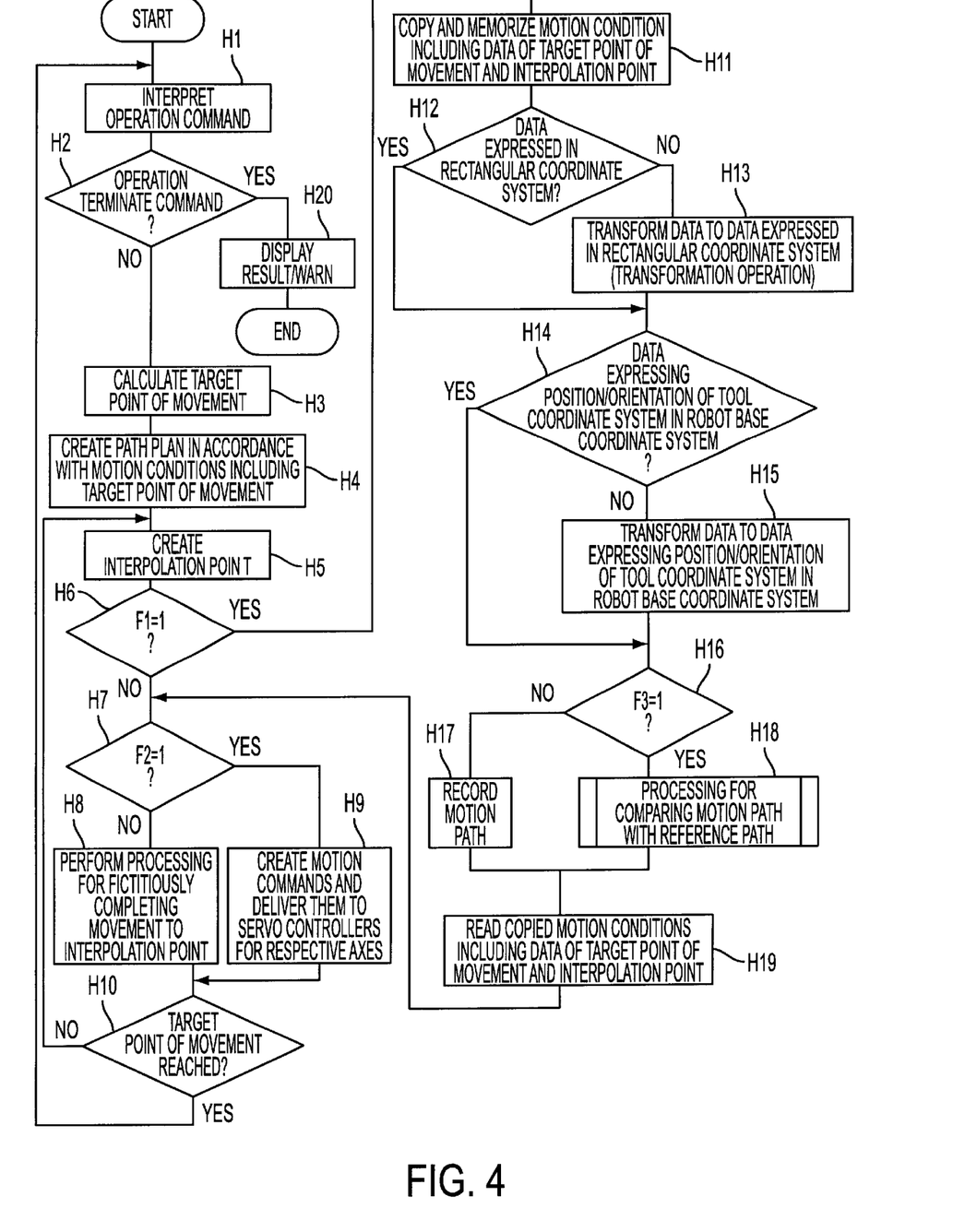
FIG. 4 is a flowchart schematically showing processing in a second embodiment of the present invention.

FIG. 4 is a flowchart for explaining essentials of processing according to the second embodiment of the invention, which is an alternative to the flowchart of FIG. 2 relating to the first embodiment. As in the case of the first embodiment, the processing starts when an operator inputs a processing start command through the teaching operation panel 104 after the values of the flags F1 to F3 are set (mode selection). The CPU 101 reads out one block of operation commands (including an operation terminate command) of an operation program prepared by preceding teaching operation, and interprets (decodes) the command (Step H1).

Generally, operation commands (except for an operation terminate command) includes a motion command of an absolute position, a motion command of a relative position, a velocity command, a manner of positioning at a target position (positioning rate), an external input/output command, and so forth. Unless the block read out is an operation terminate command (if a determination in Step H2 is "No"), the procedure proceeds to Step H3, where a target point of movement (position and orientation) is calculated from a given motion command. As in the case of the first embodiment, data of a target point of movement is calculated as data expressed in a coordinate system designated as a reference coordinate system.

Next, a path plan is prepared in accordance with motion conditions read out and interpreted in Step H1 (i.e. target position of movement, designated velocity, form of movement [straight-line movement/circular-arc movement/ respective-axis movement], acceleration/deceleration conditions, etc.) (Step H4), and interpolation points for respective axes are obtained (Step H5).

In the next Step H6, the value of the flag F1 is checked to determine whether or not a mode for performing the simulation is designated.

If F1=0 (non-simulation), the procedure proceeds to Step H7, where it is determined whether or not a real motion is required based on the value of the flag F2. If F2=0, which means that a mode not requiring a real motion is designated, the procedure proceeds to Step H8, where processing for fictitiously completing a movement to an interpolation point is performed.

The interpolation point to which movement is fictitiously completed in this Step S8 is the nearest one on the motion path of the interpolation points which have not yet undergone such fictitious movement processing. The target point (excluding an intermediate point of a circular-arc movement) of movement designated by the block is dealt with as the last interpolation point in this processing.

In the next Step H10, is it determined whether or not the interpolation point to which movement has been fictitiously completed in Step H8 is the last interpolation point, i.e., the target point of movement. If the determination is "Yes", the procedure returns to Step H1, and processing of the next one block of operation commands is started. If the determination is "No", the procedure returns to Step H5, and the next interpolation point is obtained. Then, the processing in Steps H5–H8 and H10 is repeated until "Yes" is outputted in Step H10.

If F1=0 and F2=1, precessing H9 for real motion (preparation of motion commands/output of motion commands to the servo control section) is performed in place of fictitious movement processing in Step H8. The processing H9 is essentially the same as the processing for ordinary playback operation. Also in the case where a real motion is performed, when the target point of movement is reached (the determination in Step H10 is "Yes"), the procedure returns to Step H1, and processing of the next one block of operation commands is started.

If the flag F1 is designated to be "1" (F1=1) for performing the simulation, the procedure proceeds from Step H6 to Step H11. In Step H11, the target point of movement and the interpolation point calculated in Steps H3 and H5, respectively, and the other motion condition data (designated velocity, form a movement, acceleration/ deceleration conditions, etc.) are copied and temporarily memorized in a space area of the memory 102.

Then, it is determined whether or not the target point of movement and the interpolation point calculated in Steps H3 and H5 are data expressed in a rectangular coordinate system (Step H12). If the determination is "Yes", the procedure proceeds directly to Step H14, and if the determination is "No", the procedure proceeds to Step H14 after the data is transformed to data expressed in a rectangular coordinate system by transformation operation (Step H13).

In Step H14, it is determined whether or not the data of target point of movement and the interpolation point expresses positions and orientations in a specific robot coordinate system which is used as a reference coordinate system in path comparison. If the determination is "Yes", the procedure proceeds directly to Step H16, and if the determination is "No", the procedure proceeds to Step H16 after the data is transformed to data expressed in the robot coordinate system by transformation operation between coordinate systems (Step H15).

In Step H16, it is determined whether or not a mode for performing the simulation in a comparison mode is designated. If F3=0 (non-comparison mode), the procedure proceeds to Step H17, where the motion path (the target point of movement, the interpolation point and the form of movement) is memorized in the memory 102 with a simulation performance identification number. For example, if the present current simulation is a second-time performance of simulation of an operation program named "BB", a number "SIM02BB" is given.

If F3=1 (comparison mode), the procedure proceeds to Step H18 and comparison processing is performed. As in the case of the first embodiment, the comparison processing is processing such that the present movement path and a reference path are compared and the result of comparison is recorded if necessary. However, there are some differences in that the path comparison is performed considering the interpolation points. An example of algorithm will be described later.

When the comparison processing is completed, the procedure proceeds to Step H19, where the data memorized temporarily in Step H11 (the target point of movement, the interpolation point and the other motion condition data) is read out. Then the procedure proceeds to Step H7. As already described, in Step H7 and the following steps, processing for fictitiously completing a movement to the target point (Steps H8→H10→H5→H6→H7) or processing for movement of the robot real machine (Steps H9→H10→H5→H6→H7) is performed according to the value of the flag F2 ("0" or "1"), and the procedure returns to Step H11. However, if "Yes" is outputted in Step H10 (processing of one block is completed), the procedure returns to Step H1.

The above described processing cycle is repeated until "Yes" is obtained at the determination of Step H2. When "Yes" is obtained in Step H2, the result of comparison processing 18 (the details thereof will be described later) is displayed on the display provided on the teaching operation panel 104, and the processing is terminated (Step H20). As in the case of the first embodiment, it is preferable that if the result of the comparison processing (Step H18) indicates that the difference of the paths exceeds the reference value, processing for outputting a message is performed, for example, an alarm signal is outputted for activating a buzzer or the like.

Figure 5:
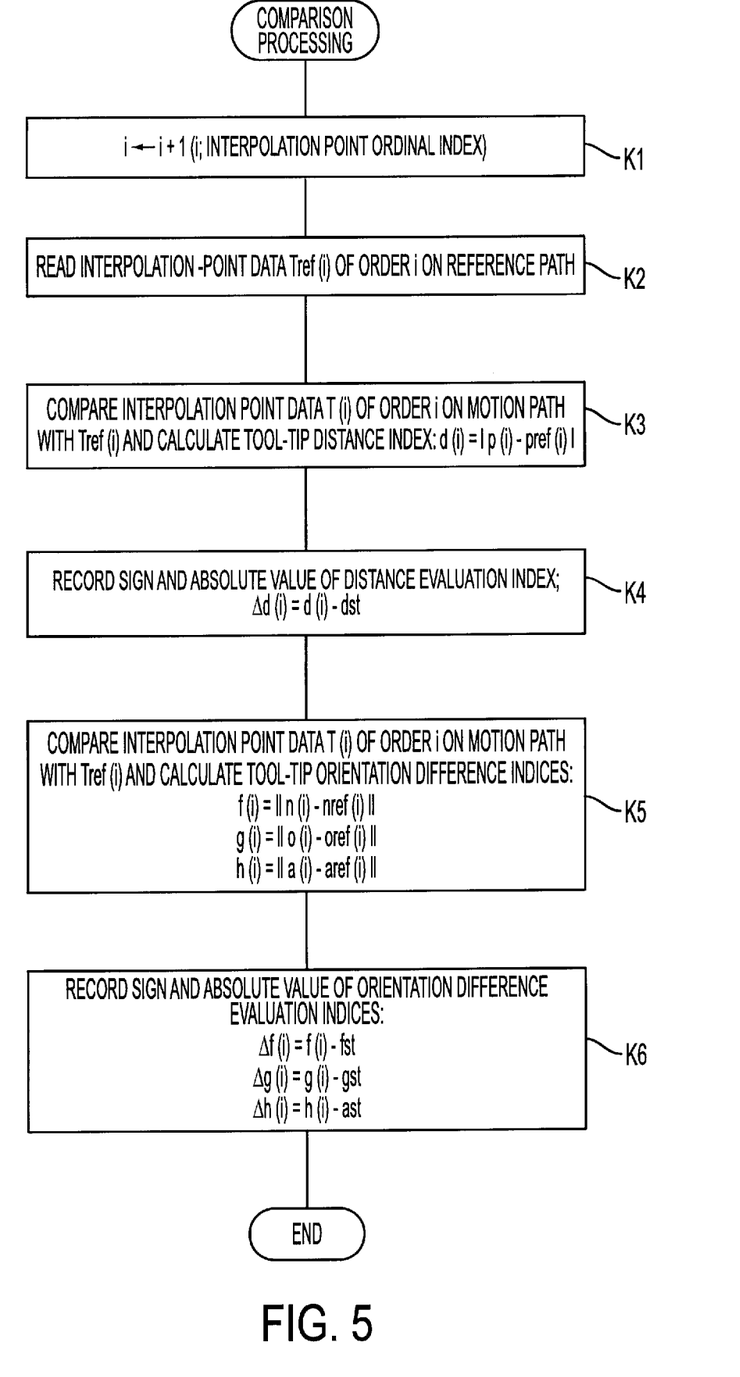
FIG. 5 is a flowchart schematically showing comparison processing performed in the second embodiment of the present invention.

Next, the comparison processing performed in the second embodiment (Step H18) will be described. The comparison processing performed in the second embodiment is processing such that each time Step H18 is performed, an interpolation point on a movement path being simulated is compared with a corresponding interpolation point on a reference path to determine whether or not there is a "deviation" exceeding a predetermined value between the two paths, and to record the result of the comparison if necessary. Here, indices of "deviation" similar to those in the first embodiment are used, and an algorithm shown by a flowchart of FIG. 5 is adopted. It is to be noted that the target point of movement (excluding an intermediate point of a circular-arc movement) is dealt with as the last interpolation point.

As in the case of the first embodiment, a path recorded in the latest performance is generally used as a reference path. Alternatively, a different specific path (for example, a path of which safety has been confirmed by low-speed operation) may be designated as a reference path using the above mentioned simulation performance identification number.

In the processing shown by the flowchart of FIG. 5, a difference between the paths is evaluated with regard to positions and orientation of paired interpolation points corresponding to each other. Specifically, the path difference is evaluated, using an index dp for evaluation in terms of tool tip position and an index dc for evaluation in terms of tool tip orientation, as in the case of the first embodiment. The essentials of each step are as follows:

First, each time Step H18 is performed, an interpolation point ordinal index i is incremented by 1 (Step K1). The initial value (at the time the processing shown by the flowchart of FIG. 4 is started) of the interpolation point ordinal index is 0, and when "Yes" is outputted in Step H10, the interpolation point ordinal index is cleared as i=0 (not shown in the flowchart of FIG. 4).

In the next Step K2, data Tref(i) expressing, in the reference robot coordinate system, position and orientation of the tool tip at an interpolation point of order i on the reference path (a homogeneous transformation matrix) is read out. As described above, the matrix Tref(i) and matrix T(i) which expresses position and orientation of the tool tip at an interpolation point of order i on a path being simulated are expressed by the following expressions (27) and (28). Such expressions will be used in the following description.

$$T(i) = \left[ \begin{array}{c|c} R(i) & p(i) \\ \hline 0 & 1 \end{array} \right] = \left[ \begin{array}{ccc|c} n(i) & o(i) & a(i) & p(i) \\ \hline & 0 & & 1 \end{array} \right] \quad (27)$$

$$Tref(i) = \left[ \begin{array}{c|c} Rref(i) & pref(i) \\ \hline 0 & 1 \end{array} \right] = \left[ \begin{array}{ccc|c} nref(i) & oref(i) & aref(i) & p(i) \\ \hline & 0 & & 1 \end{array} \right] \quad (28)$$

In Step K3, with respect to the interpolation points of order i on both paths an index d(i) expressing a distance between tool tips is calculated according to the following expression (29).

$$d(i)=|p(i)-pref(i)| \quad \ldots (29)$$

Then, in Step K4, the index d(i) of the tool tip distance is compared with a reference value dst to obtain an index for evaluation of distance d(i) according to the following expression (30), and the sign and the absolute value of the index for evaluation of distance are recorded. If the sign is positive, it means that the tool tip distance exceeds the reference value. If the sign is negative or 0, it means that the tool tip distance does not exceed the reference value.

$$\Delta d(i)=d(i)-dst \quad \ldots (30)$$

Next, evaluation of difference in orientation is performed. First, in Step K5, indices f(i), g(i), h(i) expressing a difference of orientations of the tool tip at the interpolation points of order i on both paths are calculated according to the following expressions (31) to (33). Specifically, the orientations of the tool point are compared in terms of a normal vector, an orientation vector and an approach vector to evaluate the difference in orientation.

$$f(i)=\|n(i)-\mathrm{nref}(i)\| \quad \ldots (31)$$

$$g(i)=\|o(i)-\mathrm{oref}(i)\| \quad \ldots (32)$$

$$h(i)=\|a(i)-\mathrm{aref}(i)\| \quad \ldots (33)$$

Then, in Step K6, the orientation-difference indices of the tool point are compared with respective reference values fst, gst, hst to obtain orientation-difference evaluation indices $\Delta f(i)$, $\Delta g(i)$, $\Delta h(i)$ according to the following expression (34) to (36), and the sign and the absolute value of the orientation-difference evaluation indices are recorded. As in the case of the distance evaluation index $\Delta d(i)$, if the sign of the orientation-difference evaluation index $\Delta f(i)$, $\Delta g(i)$ or $\Delta h(i)$ is positive, it means that the difference in the relevant orientation component exceeds the reference value. If the sign is negative or 0, it means that the difference does not exceed the reference value.

$$\Delta f(i)=f(i)-fst \quad \ldots (34)$$

$$\Delta g(i)=g(i)-gst \quad \ldots (35)$$

$$\Delta h(i)=h(i)-hst \quad \ldots (36)$$

The above is the gist of the comparison processing performed in Step H18. Data recorded in Step K4 or K6 is displayed in STep H20. In the second embodiment, if data of all interpolation points are to be displayed, a large quantity of data needs to be displayed. Therefore, it is preferable to display data which has undergone an appropriate selection or processing. For example, the largest value of the distance evaluation index d(i) and the largest values of the orientation-difference evaluation indices $\Delta f(i)$, $\Delta g(i)$, $\Delta h(i)$ may be displayed.

Further, as in the case of the first embodiment, it is preferable that if at least one of the distance index and the orientation-difference evaluation indices has a positive sign, and alarm signal is outputted to output a predetermined message, for example, in the form of sound, blinking display, etc. to thereby call an operator's attention.

From the above description, it is understood that the robot controller according to the first or second embodiment can operate in the following 6 modes depending on how the mode flags F1 to F3 are set.

(1) In the case where the mode flags are set such that F1=0 and F2=1 (F3 is optional), a motion path simulation is not performed and a real motion is performed, which means an ordinary playback operation mode.

(2) In the case where the mode flags are set such that F1=0 and F2=0 (F3 is optional), neither a motion path simulation nor a real motion is performed.

(3) In the case where the mode flags are set such that F1=1, F2=0 and F3=0, a motion path simulation is performed and a motion path is recorded; a real motion is not performed.

(4) In the case where the mode flags are set such that F1=1, F2=1, and F3=0, a motion path simulation and a real motion are performed in parallel, and a motion path is recorded.

(5) In the case where the mode flags are set such that F1=1, F2=0 and F3=1, a motion path simulation is performed and a motion path is compared with a reference path; a real motion is not performed.

(6) In the case where the mode flags are set such that F1=1, F2=1 and F3=1, a motion path simulation and a real motion are performed in parallel, and a motion path is compared with a reference path.

As far as the above described first and second embodiments are concerned, among the above 6 modes, the modes (2) and (6) are considered to be of little use in practice. Therefore, the corresponding flag combinations (F1=F2=0 and F1=F2=F3=1) may be barred (it is to be noted that the latter combination is made use of in a third embodiment described below.)

The other modes are useful in the first and second embodiments. For example, by playing back in the mode (4) an operation program of which safety has been confirmed, modifying a taught path, and then playing back the modified program in the mode (5), whether or not the path deviates largely and how the path deviates can be rapidly and easily confirmed through Step S19 or Step H20 (display of result of comparison/message such as an alarm) without a real motion.

Next, a third embodiment will be described. In the third embodiment, processing can be started on the condition that a motion path simulation and a real motion are performed in parallel based on the above flag combination (6) (F1=1; F2=1; F3=1), and if the result of comparison between a motion path and a reference path suggests that the motion path is likely to be mistaught, the real motion can be stopped. Thus, the robot can be made to move and stopped before a portion of the motion path which is likely to be mistaught. In this case, subsequent teaching for correction can be performed easily.

In the processing performed according to the third embodiment, in addition to the above described mode flags F1 to F3, a flag F4 is provided in the memory 102 as means for changing an operation mode of the robot controller. The flag F4 is a digital register used for nullifying a real motion when necessary, and takes a value of "0" or "1" according to the following definition:

F4:F4=1 means that the function of nullifying a real motion is in an on-state (a real motion is blocked). F4=0 means that the function of nullifying a real motion is in an off-state (a real motion is not blocked).

Figure 6:
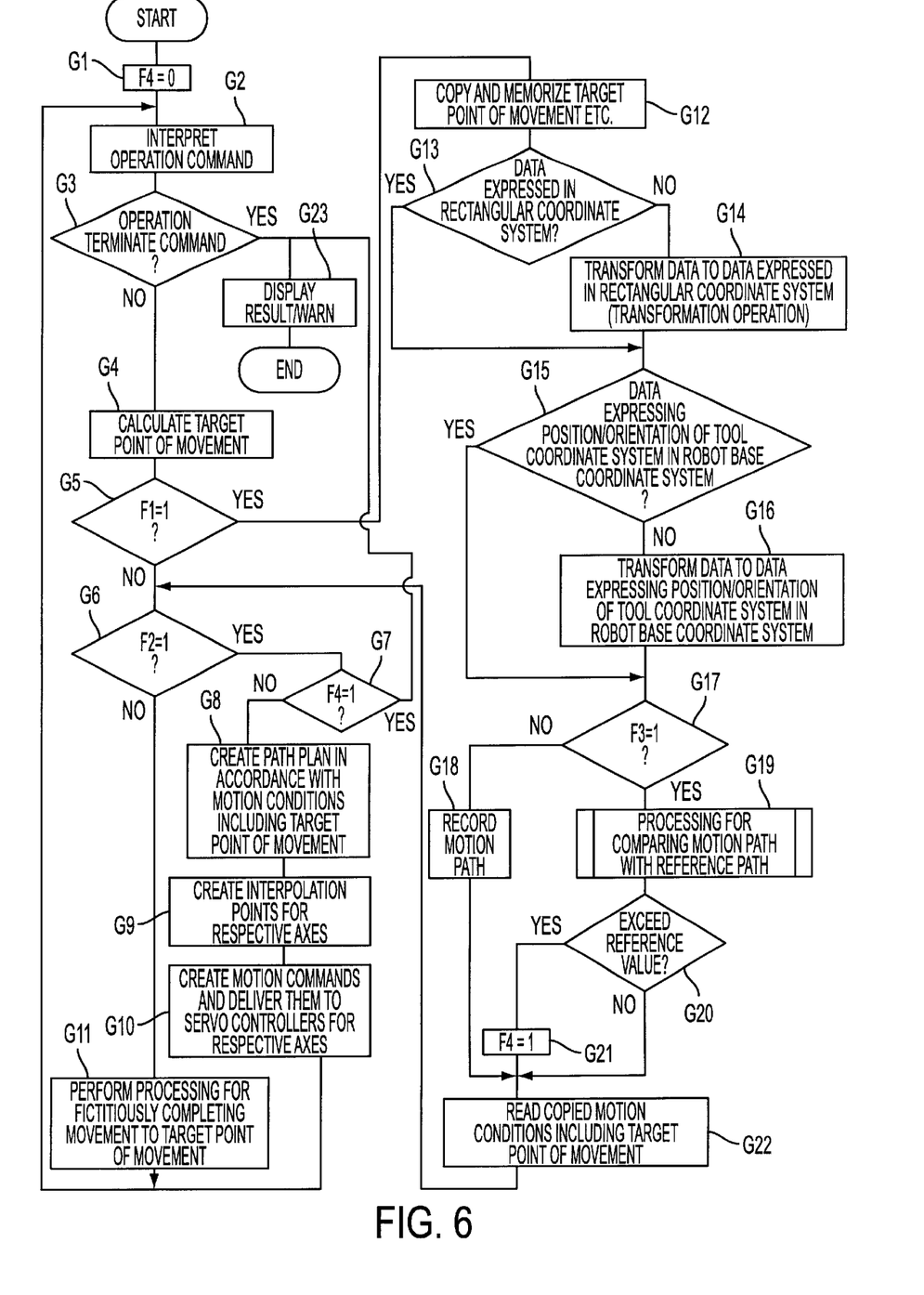
FIG. 6 is a flowchart schematically showing processing in a third embodiment of the present invention.

The essentials of processing performed according to the third embodiment is as shown by a flowchart of FIG. 6.

As in the case of the first or second embodiment, the processing starts when an operator inputs a processing start command through the teaching operation panel 104 after the values of the flags F1 to F3 are set (mode selection). The CPU 101 clears the flag F4 to "0" (Step G1) and reads one block of operation commands (including an operation terminate command) of an operation program prepared by preceding teaching operation, to interpret (decodes) the block (Step G2). Unless the block read out is an operation terminate command (if a determination in Step G3 is "No"), the procedure proceeds to Step G4, where a target point of movement (position and orientation) is calculated from a given motion command. Data on a target point of movement is calculated as data expressed in a coordinate system designated as a basic coordinate system. Next, in Step G5, the value of the flag F1 is checked to determine whether or not a mode for performing a simulation is designated.

If F1=0 (simulation is not to be performed), the procedure proceeds to Step G6, where it is determined whether or not a real motion is required based on the value of the flag F2. If F2=0, which means that a real motion is not required, the procedure proceeds to Step G11, where processing for fictitiously completing a movement to a target point of movement designated by the present block is performed. Then, the procedure returns to Step G2 and processing of the next one block of operation commands is started.

In Step G6, if F2=1, it means that a mode for a real motion is designated. In the third embodiment, however, processing for a playback operation involving a real motion is not performed unconditionally. The value of the flag F4, which determines whether or not the mode for a real motion is to be nullified, is checked (Step G7), and only if F4=0, processing for a real motion is performed in Steps G8 to G10. Specifically, a path plan is prepared in accordance with motion conditions read out and interpreted in Step G1 (target position of movement, designated velocity, form of movement [straight-line movement/circular-arc movement/ respective-axis movement], acceleration/deceleration conditions, etc.) (Step G8), interpolation points for respective axes are obtained (Step G9), and motion commands based thereon are prepared and delivered to the servo control section 105 for the respective axes (Step G10).

It is to be noted that Steps G9 and G10 are repeated in each interpolation cycle though it is not shown in the flowchart, and that when processing for movement designated by one block is completed, the procedure returns to Step G1 to start processing of the next one block of operation commands (as in the case of the first embodiment). If F4=1 in Step G7, the procedure is terminated after Step G23 without performing processing for a real motion (details thereof will be described later).

If the flag F1 is designated to be "1" (F1=1) for performing a simulation, the procedure proceeds from Step G5 to Step G12. In Step G12, the target point of movement and the other motion condition data (designated velocity, form of movement, acceleration/deceleration conditions, etc.) calculated in step G4 are copies and temporarily memorized in a space area of the memory 102.

Then, whether the target point of movement calculated in Step G4 is provided as data expressed in a rectangular coordinate system or not is determined (Step G13). If the determination is "Yes", the procedure proceeds directly to Step G15, and if the determination is "No", the procedure proceeds to Step G15 after the data is transformed to data expressed in a rectangular coordinate system by transformation operation (Step G14).

In Step G15, it is determined whether or not the data on target point of movement expresses position and orientation of a tool coordinate system in a specific robot coordination system which is used as a reference coordinate system in path comparison (for example, a robot base coordinate system is designated in advance). If the determination is "Yes", the procedure proceeds directly to Step G17, and if the determination is "No", the procedure proceeds to Step G17 after the data is transformed to data expressed in the robot coordinate system by transformation operation between coordinate systems (Step G16).

In Step G17, it is determined whether or not a mode for performing a simulation in a comparison mode is designated. If F3=0 (non-comparison mode), the procedure proceeds to Step G18, where a motion path consisting of the target point of movement and the form of movement (a straight-line movement, a circular-arc movement or a respective-axis movement) is memorized in the memory 102 with a simulation performance identification number. For example, if the present simulation is a third-time performance of simulation of an operation program named "AA", a number "GIM03AA" is given. After completing Step G18, the procedure proceeds to Step G22.

If F3=1 (comparison mode), the procedure proceeds to Step G19 and comparison processing is performed. Comparison processing is processing such that the present movement path and a reference path are compared and the result of comparison is recorded if necessary. Here, the algorithm used in the first embodiment (see FIG. 3) can be used. The description of the details thereof will not be repeated here.

It is to be noted that in the present embodiment, if at least one of the distance evaluation index $\Delta d$ and the orientation-difference evaluation indices $\Delta f$, $\Delta g$, $\Delta h$ has a positive sign, that is, if it is determined that a difference exceeding a reference value lies between both paths, the flag F4 is turned to "1" to nullify the mode for a real motion (Step G21).

In the succeeding Step G22, the data memorized temporarily in Step S12 (the target point of movement and the other motion condition data) is read out. Then the procedure proceeds to Step S6.

As already described, if the value of the flag F2 is "0", processing for fictitious movement to the target point (Step G11) is performed regardless of the value of the flag F4, and the procedure returns to Step G2 (without performing a real motion).

In contrast thereto, if the value of the flag F2 is "1", only when the value of the flag F4 is "0", the procedure proceeds from G7 to Step G8 and under, where processing for movement of the robot real machine is performed.

Specifically, if F4=1, a real motion on the present path is not performed and the procedure proceeds to Step G23, where the result of comparison processing (Step G19) is displayed on the display provided to the teaching operation panel 104. Then, the procedure is terminated, because the flag F4 turned to "1" indicates that a difference exceeding the reference value is found between a path on which a real motion is to be performed (played-back operation path) and the reference path in Steps G19 and G20. In this case, if a real motion is continued (or started in the case of a first path section), it may incur dangers attributable to misteaching. Conversely, dangers attributable to misteaching can be prevented by attending to an output expressing the result of comparison processing included in the simulation.

In the case where the robot stops because F4=1, the robot stops before a portion of the path which is likely to be mistaught. This is advantageous when necessary measures such as correction of misteaching are to be taken rapidly referring to the result displayed in Step G23, especially a message telling how the difference exceeds the reference value.

According to the present invention, a mistaught path which may harm safety can be found by performing a playback operation not involving a real motion of a robot body without using an off-line simulation system. Further, by a playback operation involving a real motion, a real motion can be performed comparing a played-back path with a reference path, and if it is found that dangers due to misteaching may occur, the mode for a real motion can be nullified to stop the robot. Thus, the safety and efficiency of teaching operation is increased.

What is claimed is:

1. A robot controller having a function of simulating a motion path of a robot, comprising:
   means for storing a first and a second operation program,
   means for performing a playback operation of said first operating program,
   path memory means for storing data indicative of a first motion path described in said first operation program,
   means for performing a playback operation of the second operation program so that said robot does not perform a real motion,
   path comparison means for comparing data indicative of a second motion path described in said second operation program with said data indicative of said first motion path when the second operation program is played back,
   evaluating means for evaluating a difference between said second motion path and said first motion path, and
   output means for outputting result of the evaluation by said evaluating means.

2. A robot controller according to claim 1, wherein said path comparison means comprises position and orientation of the robot on said second motion path with position and orientation of the robot on said first motion path, and said evaluating means evaluates the difference between said second motion path and said first motion path taking account of position and orientation of the robot.

3. A robot controller according to claim 1, further comprising display means for displaying result of the evaluation outputted by said output means.

4. A robot controller according to claim 1, further comprising means for outputting a predetermined message when said output means outputs results of the evaluation indicating that there is a difference exceeding a reference value between said second motion path and said first motion path.

5. A robot controller having a function of simulating a motion path of a robot, comprising:
   means for storing a first and a second operation program,
   means for performing a playback operation of said first operation program,
   path memory means for storing data indicative of a first motion path described in said first operation program including data indicative of an interpolation point when said first operation program is played back,
   means for performing a playback operation of the second operation program so that said robot does not perform a real motion,
   path comparison means for comparing data indicative of a second motion path described in said second operation program with said data indicative of said first motion path when the second operation program is played back,
   evaluating means for evaluating a difference between said second motion path and said first motion path, and
   output means for outputting result of the evaluation by said evaluating means.

6. A robot controller according to claim 5, wherein said path comparison means compares position and orientation of the robot on said second motion path with position and orientation of the robot on said first motion path, and said evaluating means evaluates the difference between said second motion path and said first motion path taking account of position and orientation of the robot.

7. A robot controller according to claim 5, further comprising display means for displaying result of the evaluation outputted by said output means.

8. A robot controller according to claim 5, further comprising means for outputting a predetermined message when said output means outputs result of the evaluation indicating that there is a difference exceeding a reference value between said second motion path and said first motion path.

9. A robot controller having a function of simulating a motion path of a robot comprising:

means for storing a first and second operation program, means for performing a playback operation of said first operation program, path memory means for storing data indicative of a first motion path described in said first operation program when said first operation program is played back, means for performing a playback operation of the second operation program so that said robot performs a real motion, path comparison means for comparing data indicative of a second motion path described in said second operation program with said data indicative of said first motion path when the second operation program is played black, evaluating means for evaluating a difference between said second motion path and said first motion path, and output means for outputting result of the evaluation by said evaluating means.

10. A robot controller according to claim 9, wherein said path comparison means compares position and orientation of the robot on said second motion path with position and orientation of the robot on said first motion path, and said evaluating means evaluates the difference between said second notion path and said first motion path taking account of position and orientation of the robot.

11. A robot controller according to claim 9, further comprising display means for displaying result of the evaluation outputted by said output means.

12. A robot controller according to claim 9, further comprising means for outputting a predetermined message when said output means outputs result of the evaluation indicating that there is a difference exceeding a reference value between said second motion path and said first motion path.

13. A robot controller according to claim 9, further comprising real motion nullification means for nullifying a real motion of the robot when said output means output result of the evaluation indicating that there is a difference exceeding a reference value between said second motion path and said first motion path.

14. A robot controller having a function of simulating a motion path of a robot, comprising:

means for storing a first and a second operation program, means for performing a playback operation of said first operation program, path memory means for memorizing data indicative of a first motion path described in the first operation program including data indicative of an interpolation point when said first operation program is played back, means for performing a playback operation of the second operation program so that said robot performs a real motion, path comparison means for comparing data indicative of a second motion path described in said second operation program with said data indicative of said first motion path when the second operation program is played back, evaluating means for evaluating a difference between said second notion path and said first motion path, and output means for outputting result of the evaluation by said evaluating means.

15. A robot controller according to claim 14, wherein said path comparison means compares position and orientation of the robot on said second motion path with position and orientation of the robot on said first motion path, and said evaluating means evaluates the difference between said second motion path and said first motion path taking account of said position and orientation of the robot.

16. A robot controller according to claim 14, further comprising display means for displaying result of the evaluation outputted by said output means.

17. A robot controller according to claim 14, further comprising means for outputting a predetermined message when said output means outputs results of the evaluation indicating that there is a difference exceeding a reference value between said second motion path and said first motion path.

18. A robot controller according to claim 14, further comprising real motion nullification means for nullifying a real motion of the robot when said output means outputs result of the evaluation indicating that there is a difference exceeding a reference value between said second motion path and said first motion path.

19. A robot controller simulating a motion path of a robot, comprising:

a storage unit storing a first and second operation program; and a processor in communication with the storage unit, to playback said first operation program, to store data of a first motion path corresponding to said first operation program, to playback the second operation system program, to compare data of a second motion path corresponding to said second operation program with said data of said first motion path when the second operation program is played back, and to output a result indicating differences between said first motion path and said second motion path.

20. A method of simulating motion path of a robot controller, comprising:

storing a first and a second operation program;

playing back said first operation program;

storing data of a first motion path corresponding to said first operation program;

playing back the second operation program;

comparing data of second motion path corresponding to said second operation program with said data of said first motion path when the second operation program is played back; and outputting a result indicating differences between said first motion path and said second motion path.

* * * * *

UNITED STATES PATENT AND TRADEMARK OFFICE
CERTIFICATE OF CORRECTION

PATENT NO.   : 6,463,358 B1
DATED        : October 8, 2002
INVENTOR(S)  : Atsushi Watanabe et al.

It is certified that error appears in the above-identified patent and that said Letters Patent is hereby corrected as shown below:

<u>Column 16,</u>
Line 33, change "results" to -- result --.
Line 35, change "first" to -- fifth --.

Signed and Sealed this

First Day of April, 2003

JAMES E. ROGAN
*Director of the United States Patent and Trademark Office*